UNITED STATES PATENT OFFICE.

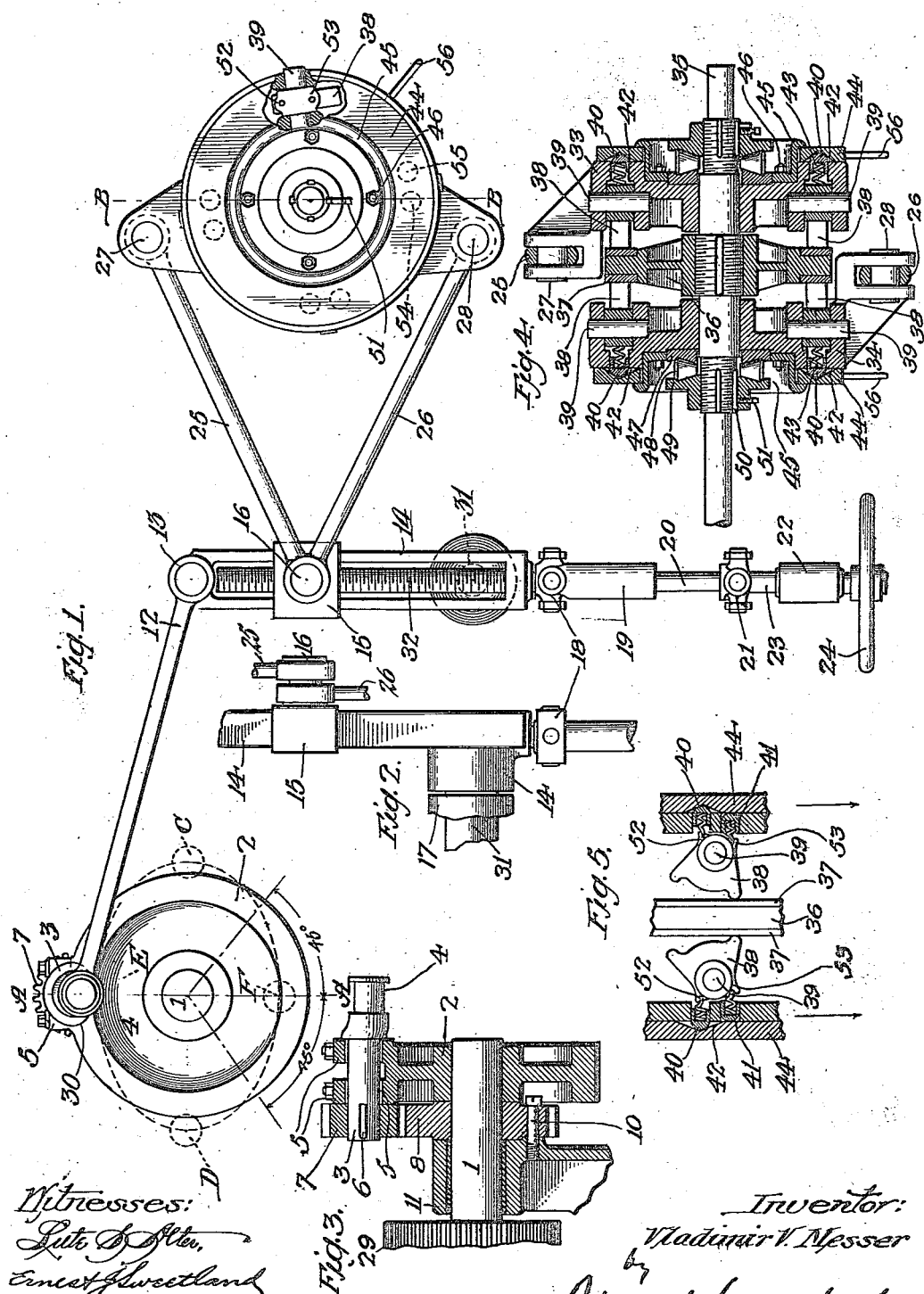

VLADIMIR V. MESSER, OF LOS ANGELES, CALIFORNIA, ASSIGNOR TO FELLOWS DIRECT POWER TRANSMISSION CO., OF LOS ANGELES, CALIFORNIA, A CORPORATION OF ARIZONA.

VARIABLE-SPEED POWER TRANSMISSION.

1,045,582. Specification of Letters Patent. Patented Nov. 26, 1912.

Application filed April 2, 1909. Serial No. 487,587.

*To all whom it may concern:*

Be it known that I, VLADIMIR V. MESSER, a citizen of the United States, residing at Los Angeles, in the county of Los Angeles and State of California, have invented a new and useful Improvement in Variable-Speed Power Transmission, of which the following is a specification.

My invention relates to improvements in the intermittent grip type of power transmission in which a circular wheel, with which an oscillating pawl engages to turn the wheel forward, is revolved by the said pawl, the amount of oscillatory movement of which pawl is varied in order to vary the velocity of the driven machinery.

It is well known that in order to transmit the power from one shaft rotating at a uniform velocity, to another shaft to be rotated also with a uniform velocity, that the engagements between the two shafts must be of such a nature as not to disturb the uniformity of the velocities of either shaft, in order to avoid hammering effects produced by the irregularities of the velocities. In other words, the angular velocity of both shafts at any given moment should have the same ratio, and the angles through which both shafts pass in any period of time should have the same ratio mentioned above. This is accomplished in most gear or belt transmissions, but has not been accomplished in a ratchet mechanism where the oscillating pawl is driven by a crank pin so far as I am aware. In such a case the pawl moves at a varying speed in each stroke like the crosshead of a reciprocating engine and thus imparts irregular motion to the driven shaft, and if the driven shaft has any momentum it will result in a hammering effect on the connecting link and ratchet, rendering the mechanism impracticable and short-lived. Attempts have been made to overcome this difficulty by increasing the number of ratchets so as to make each ratchet work in the middle of its stroke while it travels at maximum speed, but it is plainly seen that such expedient not only complicates the machine, but does not remove the cause of trouble, and only minimizes the effect of it to a certain extent.

The object of my invention is to provide mechanism for imparting uniform velocity to the pawl driven by a crank pin of a driving shaft, and produce a perfectly uniform rotative motion without hammering effect on the ratchet or connecting links. I attain these objects by the mechanism illustrated in the accompanying drawing in which—

Figure 1 represents the side view of the mechanism. Fig. 2 is a side view of the arm for varying the amount of travel of pawls. Fig. 3 is a cross section of the driving mechanism on the line A—A of Fig. 1. Fig. 4 is a cross section of the driven shaft on the line B—B of Fig. 1, and Fig. 5 shows a top view of pawls, also the reversing mechanism.

Similar letters refer to similar parts throughout the several views.

The driving shaft 1 is mounted in the bearing 11 and is operated by gear 29 which is connected with the motor, not shown. A disk 2 is pressed on the shaft 1 and has a saddle 30 in its periphery to receive bearings 5 for an eccentric pin 3, the eccentricity of which should be about one-twentieth of the distance between the center line of the shaft 1 and that of the bearings 5. A spur gear 7 is secured to the inner end of the pin 3 by means of a key 6 and meshes with a spur gear 8. The gear 8 has twice as many teeth as the gear 7, and is secured to the main frame by means of cap screws 10, so when the shaft 1 revolves, the crank 4, which forms an integral part of the pin 3, rotates with the pin 3, since the gear 8 is stationary, and the crank 4 thus makes twice as many turns as the shaft 1. The eccentricity of the crank 4 with relation to the axis of the pin 3 is such that when the pin 4 passes through the dead centers C and D, see Fig. 1, it is in the farthest position from the axis of the shaft 1, and when at points E or F which are on a line perpendicular to the line passing through the dead centers C and D, the pin 4 is in its closest position to the axis of shaft 1. The crank pin 4 describes an oval curve resembling an ellipse, shown on Fig. 1 in dotted line C E D F. When the ratio between the throw of eccentric pin 4 is equal to about five per cent of the distance between the center line of the shaft 1 and the axis of the pin 3, then the amount of reciprocating movement of the pin 4 in the direction of the line C D is so close in proportion to the angles through which the shaft 1 passes, that if the distance C D equals fifteen inches the reciprocating movement in the said direction in the length of the travel of the crank within forty-five degrees on each side of the line E F never leaves the point that would be traveling between said points at a uniform speed for more than one-hundredth part of an inch, if all the distances are taken in the direction of the line C D.

The crank 4 is connected with a pin 13 of a rocker arm 14 by means of a link 12. The rocker arm 14 swings on a shaft 31 supported by a bearing 17. A slide 15 on the rocker arm 14 engages a screw 32, which is turned by means of a hand wheel 24 supported by a bracket 22 and connected with the screw 32 by means of two universal joints 18 and 21 and a telescopic link formed by a rod 20 which is slidably received by a socket sleeve 19. This arrangement permits the working of the screw 32 when the arm 14 is in motion. The screw 32 while turning moves the slide 15 up or down as the case may be and regulates the amount of travel of the pin 16 to which are attached links 25 and 26 which latter are directly connected with pawl spiders 33 and 34 respectively. The pawl spiders are loosely mounted on shaft 35 the middle part of which is threaded and key seated to receive a bearing disk 36 having rings 37 which form wearing surfaces to receive the pressure of pawls 38 which are revoluble on pins 39.

The metal in the pawls 38 is so arranged that the center of gravity of the pawl is on the center line of the bore made for the pins 39 to avoid the influence of inertia on the working of springs 40 and 41. Said springs are inserted between lugs 52 and 53 on the pawls 38 and caps 40 and 41 which slide in holes 54 and 55 of the pawl spiders 33 and 34.

The rings 44 are mounted on the outside of the pawl spiders 33 and 34 and are held in place by means of rings 45 bolted to the pawl spiders by bolts 46. On the inner side of the ring 44 there are notches 42 which fit on the outside of the caps 40 or 41, as the case may be. In Fig. 1 part of the ring 44 is broken away in order to show the location of one of the pawls viewed in the direction of the driven shaft. The rings 44 are provided for reversing the direction of rotation of the disk 36 which is accomplished by turning handle 56 in order to force the caps 40 out of the notches 42 and receiving the caps 41 into same notches, whereby more pressure is brought to bear on the lugs 52 of the pawls 38 than on the lugs 53, which causes the pawls to turn and be ready to engage the disk 36 when the pawl spiders, while oscillating, run in the opposite direction.

The action of the pawls is similar to that of a toggle joint, so far as the gaining of pressure is concerned. The friction between the pawls and the disk 36 is produced automatically the moment the pawl spiders 33 or 34 move in the direction shown by the arrows in Fig. 5, the initial friction between the pawls and the ring 37 being produced by the difference of the tension of the springs received by the caps 40 and 41 one of which two is always in the notches 42 of the ring 43. The pressure of the friction pawls 38 is transferred to the adjusting nuts 49 on the ends of the shaft by means of cone shaped steel rollers 48 which bear on a steel race 47 on one side and a nut 49 on the other. The nuts 49 are introduced for adjustment purposes when the pawls 38 wear out. The adjustment is made by turning the nuts 49 and inserting a key 50 in one of the several key seats provided on the shaft for the purpose. The key is fastened by means of set screws 51. A set of rolls 48 is provided to facilitate the disengagement of the pawls at the end of the stroke.

The accompanying drawings show the details of my invention for producing a uniform speed reciprocating motion. In order to use the mechanism for power transmission purposes, there should be two cranks with crank pins 4 located ninety degrees apart, mounted on the same shaft 1 and the transmitting mechanism shown in Figs. 1 and 4 should be duplicated also, in order to produce a continuous turning effect to revolve the shaft 35 on which two disks should be mounted, one for each of the two crank pins 4. This arrangement, which is a mere duplication of the mechanism just described, is so well known in the art and commonly employed in intermittent power transmissions that illustration or detailed description thereof would be superfluous.

What I claim is:—

1. In a power transmission, a rotary driven element, an oscillatory device for operating the driven element, a crank connected with the oscillatory device, and means for imparting a combined axial and bodily rotation to said crank, whereby the driven element is caused to rotate at a substantially uniform speed throughout a revolution.

2. In a power transmission, a rotary driven element, an oscillatory device for operating the driven element, a crank connected with the oscillatory device, and means for operating said crank and causing its pin to move in an oval orbit, whereby the driven element is caused to rotate at a substantially uniform speed throughout a revolution.

3. In a power transmission, a rotary driven element, an oscillatory device for operating the driven element, a crank connected with the oscillatory device, and means for operating said crank and causing its pin to move in an oval orbit with the major axis of the orbit substantially in line with the line of movement of the oscillatory device, whereby the driven element is caused to rotate at a substantially uniform speed throughout a revolution.

4. In a power transmission, a rotary driven element, an oscillatory device for operating the driven element, and means operating in an elliptical orbit connected with the oscillatory device for operating the same, whereby the driven element is caused to rotate at a substantially uniform speed throughout a revolution.

5. In a power transmission, a rotary driven element, an oscillatory device for operating the driven element, a main crank, an auxiliary crank mounted on the main crank, and connected to the oscillatory device, means for revolving the main crank and thereby causing bodily rotation of the auxiliary crank, and means for axially rotating the auxiliary crank.

6. In a power transmission, a rotary driven element, an oscillatory device for operating the driven element, a main crank, an auxiliary crank on the main crank connected with the oscillatory device, and means for causing the auxiliary crank to rotate axially twice during each bodily rotation thereof, whereby the driven element is caused to rotate at a substantially uniform speed throughout a revolution.

7. In a power transmission, a rotary driven element, an oscillatory device for operating the driven element, a shaft, a main crank thereon, an auxiliary crank and connected to the oscillatory device on the main crank, a stationary gear concentric with the main shaft, and a gear on the auxiliary crank meshing with the first gear.

8. In a power transmission, a rotary driven element, an oscillatory device for operating the driven element, a shaft, a main crank thereon, an auxiliary crank and connected to the oscillatory device on the main crank, a stationary gear concentric with the main shaft, and a gear half the diameter of the first gear on the auxiliary crank meshing with the first year.

In testimony whereof, I have hereunto set my hand at Los Angeles, California, this 26th day of March 1909.

VLADIMIR V. MESSER.

In presence of—
G. T. HACKLEY,
FRANK L. A. GRAHAM.